United States Patent [19]
Hora et al.

[11] Patent Number: 5,389,822
[45] Date of Patent: Feb. 14, 1995

[54] TRIGGERING CIRCUIT FOR A SAFETY DEVICE IN MOTOR VEHICLES

[75] Inventors: Peter Hora; Günther Fendt, both of Schrobenhausen, Germany

[73] Assignee: Messerschmitt-Bolkow-Blohm GmbH, Germany

[21] Appl. No.: 691,869

[22] Filed: Apr. 26, 1991

[30] Foreign Application Priority Data

May 23, 1990 [DE] Germany ............................. 4016644

[51] Int. Cl.$^6$ ............................................. B60R 21/32
[52] U.S. Cl. .................... 307/10.1; 307/121; 280/735; 364/424.05
[58] Field of Search ............................. 307/10.1, 121; 340/436–438; 180/274, 281, 282, 286; 280/735; 364/424.05

[56] References Cited

U.S. PATENT DOCUMENTS

| | | | |
|---|---|---|---|
| 3,851,305 | 11/1974 | Baba et al. | 180/274 |
| 4,836,024 | 6/1989 | Woehrl et al. | 307/10.1 X |
| 4,845,377 | 7/1989 | Swart | 307/10.1 |
| 4,873,452 | 10/1989 | Morota et al. | 307/10.1 |
| 4,950,914 | 8/1990 | Kurihara et al. | 307/10.1 |
| 4,958,851 | 9/1990 | Behr et al. | 307/10.1 X |

FOREIGN PATENT DOCUMENTS

| | | | |
|---|---|---|---|
| 2851333 | 6/1980 | Germany . | |
| 3400533 | 12/1985 | Germany . | |
| 63-82397 | 1/1990 | Japan | 307/10.1 |

*Primary Examiner*—Marc S. Hoff
*Assistant Examiner*—Fritz M. Fleming
*Attorney, Agent, or Firm*—Evenson, McKeown, Edwards & Lenahan

[57] ABSTRACT

A triggering circuit for a safety device, such as an air bag or a belt tightening device, such as an air bag or a belt tightening device, for the protection of motor vehicle occupants during an impact of the motor vehicle. The triggering circuit has a redundant arrangement of at least two acceleration sensors with mutually independent analyzing circuits, and all acceleration sensors with their analyzing circuits are connected with one another by way of an electric AND-circuit.

6 Claims, 1 Drawing Sheet

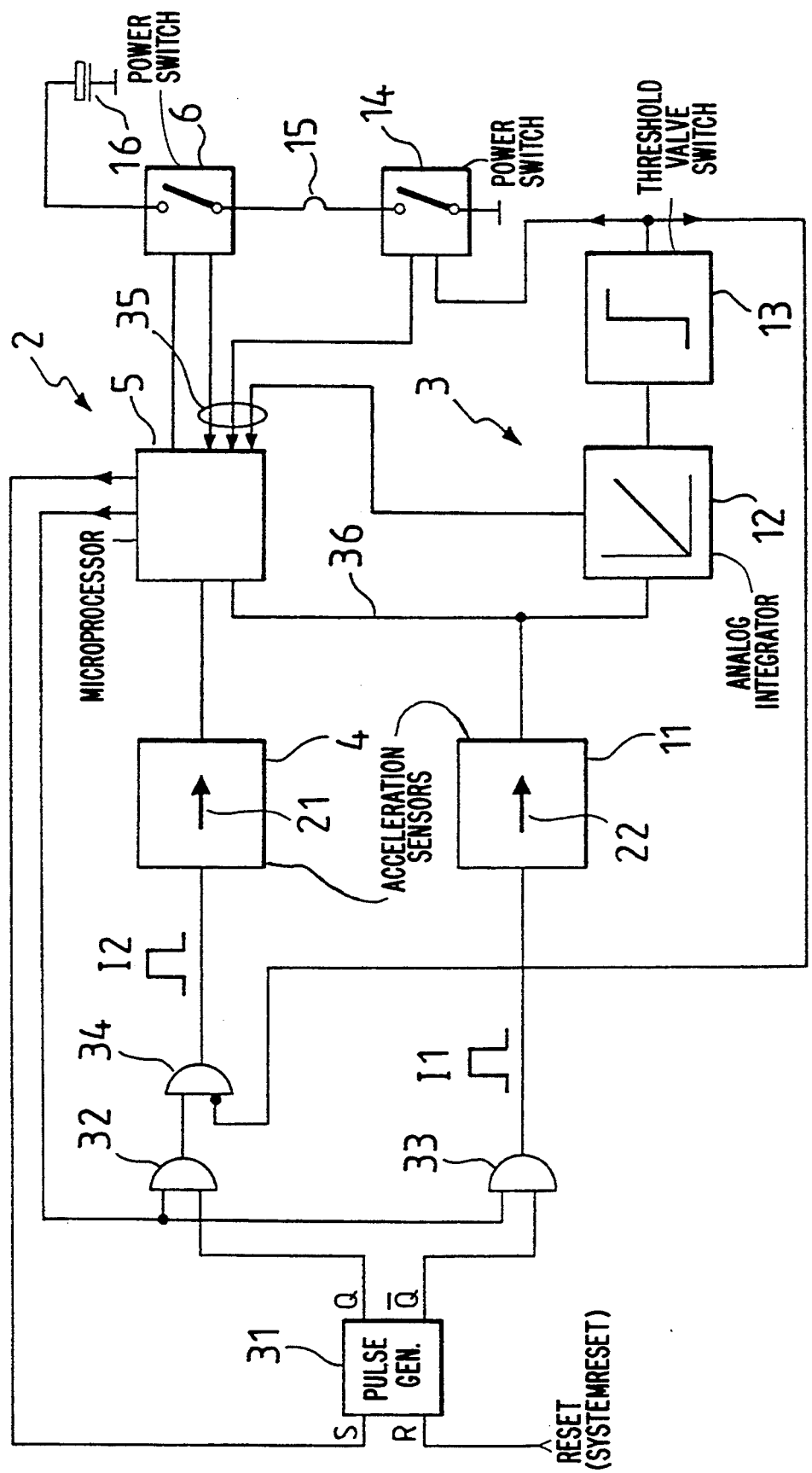

TRIGGERING CIRCUIT FOR A SAFETY DEVICE IN MOTOR VEHICLES

BACKGROUND AND SUMMARY OF THE INVENTION

The invention relates to a triggering circuit for safety devices particularly restraint systems, such as air bags or belt tightening devices for motor vehicle occupants.

Prior art triggering circuits of this type have typically included an acceleration sensor and an analyzing circuit. Because the determination of whether to activate the safety device is based on the output signal of the acceleration sensor, quality and dependability of such acceleration sensors are most important. During its whole useful life, the sensor may vary its sensitivity only slightly.

In order to increase the safety of the overall triggering mechanism, it is known, for example, from the German Patent Document DE-PS 34 00 533 to equip the triggering circuit with an additional safety switch in the form of a mechanical acceleration switch connected in series with the switch in the energizing circuit (controlled by the analyzing circuit) of the ignition element for the safety device. The energizing circuit is therefore closed only when two criteria exist simultaneously; that is, when the analyzed acceleration signal exceeds a threshold value, and the safety switch is also closed. The safety switch may, for example, be a small mercury switch which closes a contact in the energizing circuit as a result of the deceleration during an impact of the motor vehicle. A test circuit for the whole triggering device is also disclosed, in which an electric signal is supplied to the analyzing circuit instead of the sensor signal; so that a performance test of the analyzing circuit becomes possible. Triggering of the safety device during the test is not possible because the mechanical safety switch remains open.

A test for an electric or electronic analyzing circuit is also disclosed in German Patent Document DE-OS 28 51 333, in which the triggering of the ignition element of the safety device is performed by a main power switch and an additional auxiliary power switch connected in parallel thereto. During normal operation, the auxiliary power switch is closed so that the safety device can be triggered upon impact; the auxiliary power switched is opened only during the testing so that the main power switch can be closed and the analyzing circuit can be tested without the risk of activating the safety device.

Since it cannot be closed from the outside, the operability of the mechanical safety switch of the triggering circuit according to the above mentioned German Patent Document De-PS 34 00 533 must be tested only indirectly by determining whether the electric resistance is sufficiently high when the switch is opened. Since it cannot be tested whether the safety switch actually closes, a safety switch that cannot close may go undetected, and the safety device cannot be activated in an emergency.

Moreover, mechanical safety switches cannot be installed in the motor vehicle in an arbitrary position. Mechanical safety switches such as the above-mentioned mercury switches, for example, use the gravitation of the earth as a restoring force. In the case of modern safety devices, however, all components are integrated in the smallest possible space and (in the case of an air bag) the whole safety device is installed in the steering wheel of the motor vehicle. A triggering circuit having a safety switch that must be restored by the earth's gravitation cannot be used for this purpose because, as a result of the turning of the steering wheel, the position of the safety switch changes constantly (also in the off-position of the motor vehicle) so that gravitation restoration is not possible.

It is an object of the present invention to ensure the reliability of the triggering circuit, even in the above-mentioned case. Another object of the invention to provide a safety device which operates reliably independently of the installation of the triggering circuit and which can be tested with respect to operatability in all its components.

These and other objects and advantages are achieved according to the invention by means of a parallel arrangement of at least two acceleration sensors with mutually independent triggering paths. A mechanical safety switch is not required in the case of an AND-operation of the respective triggering paths because the second triggering path takes over the function of the safety switch. The acceleration sensors are installed approximately at the same point in the motor vehicle so that, in the case of an accident, they are affected essentially by the same forces or decelerations. Preferably, direction-sensitive acceleration sensors are used, which have axes of sensitivity situated in the same direction. At least one of the analyzing circuits operates preferably digitally and contains, for example, a microprocessor, while another analyzing circuit operates in an analog mode. For this purpose, for example, the output signals of an analog acceleration sensor, such as a bridge circuit or a piezosensor, are integrated in an integrating circuit and, by way of a threshold value switch, are led to the switch step for the ignition element of the safety device. Upon impact of the motor vehicle, that triggering path which takes over the function of the safety switch is closed earlier, so that a critical threshold for activation of the safety device which is given by another triggering path is definitely observed.

Another advantage of a triggering circuit according to the invention is that a change of sensitivity of an acceleration sensor during the operating time is detected immediately because both acceleration sensors must detect the same driving or interference noises at the same installation point in the motor vehicle. Thus, a test may be performed by means of a microprocessor which is normally present in the analyzing circuit. If only two acceleration sensors are used and their measured values differ from one another beyond an acceptable tolerance threshold, the reliable conclusion is that there is a defect within the sensor arrangement.

In the case of the purely electronic embodiment of a triggering circuit according to the invention, it is also possible to test the operability of all triggering paths, including the associated electronic switch steps, preferably by means of a pulse generator which sequentially emits test pulses to the acceleration sensor which pass through the associated analyzing circuits. The pulse generator, such as a flip-flop arrangement, is controlled by a microprocessor which itself is used as an analyzing circuit for at least one acceleration sensor. The test pulses also pass through the acceleration sensors so that their performance can also be tested. The test pulses, which are generated by the microprocessor or by another test circuit controlling the pulse generator, can control the pulse generation for the generating of a first test pulse only if the whole triggering circuit has been set back previously, that is, if there was a preceding system reset. In this manner, for example, the analog-operating trigger path cannot be energized accidentally if there is a disturbance in the microprocessor program. This is possible only during the testing program. The whole final ignition step for the safety device in this manner, after a self-test, can only be controlled when all (as a rule, both) acceleration sensors are mechanically excited.

Other objects, advantages and novel features of the present invention will become apparent from the following detailed description of the invention when considered in conjunction with the accompanying drawings.

BRIEF DESCRIPTION OF THE DRAWING

The single Figure illustrates a schematic block diagram of a triggering circuit according to the invention.

DETAILED DESCRIPTION OF THE DRAWING

Referring to the drawing, a triggering circuit has two triggering paths 2 and 3 which operate independently of one another. The first triggering path 2 has a first acceleration sensor 4, such as a piezoelectric crystal; an analyzing circuit 5 in the form of a microprocessor; and a first electronic power switch 6 controlled by the microprocessor 5. The second triggering path 3 comprises a second acceleration sensor 11, an analog integrator 12, a threshold value switch 13 and a second electronic power switch 14.

The two power switches 6 and 14 are connected in series with a voltage source 16, in an energizing circuit for an ignition capsule 15 of a safety device. By means of this arrangement, AND-operation of the two triggering paths 2 and 3 is obtained. Ignition capsule 15 is advantageously arranged between the two electronic power switches.

The components in the two triggering paths 2 and 3 are adjusted in such a manner that, at the time of an impact of a motor vehicle, the electronic power switch 14 in the analog-operating triggering path 3 closes earlier than the electronic power switch 6 in the first triggering path 2. Thus, the first triggering path, determines the point at which the ignition capsule 15 must be reliably ignited upon impact of the motor vehicle.

The two acceleration sensors 4 and 11, for example, piezoelectric crystals or bridge sensors, are preferably installed in the motor vehicle at the same location, and are aligned identically with their sensitivity axes indicated in the figure by an arrow. Upon impact of the motor vehicle of sufficient magnitude to trigger the safety device, both acceleration sensors 4 and 11 emit output signals. With proper calibration of the integrating circuit 12 and the threshold value switch 13, a signal appears at the output of the second triggering path 3 earlier than in the first triggering path 2 so that the second electronic power switch 14 is closed. Thereafter, when the output signal of the first acceleration sensor 4 analyzed in the microprocessor 5 also exceeds the criterion for the triggering of the safety device, the first power switch 6 is closed so that a current flows by way of the ignition capsule 15 and activates it.

The microprocessor 5 also controls a pulse generator 31 in the form of an RS-flip-flop which sequentially generates two test pulses I1 and I2. The first test pulse I1, which passes through the analog triggering path 3, can be generated only after the whole system was reset; that is, there has been a preceding system reset. The second test pulse I2, which passes through the digital triggering path 2, must be generated only when power switch 14 is opened. For this purpose, a control output of the microprocessor 5 is connected with the set input of the flip-flop 31 while the reset input is serviced by the system reset. The respective outputs of the flip-flop 31 are each connected with an AND-circuit 32 and 33, the second input of which is connected to receive a joint test signal which is generated by the microprocessor, only during testing of the whole circuit after the resetting of the triggering circuit, that is, after the system reset. During the testing of the second triggering path 3, the first triggering path 2 remains blocked by the output of the threshold value switch 13, which is connected with the negating input of an AND-circuit 34, situated at the output of the AND-circuit 32. Thus the signal path for the test pulse I2 (the first triggering path 2) cannot be opened so long as a signal is present at the output of the threshold value switch.

The performance testing of all components is performed by the microprocessor 5 which has test lines 35, depicted schematically in the figure, which lead to the test points in the circuit, preferably to the two electronic power switches 6 and 14. The output of the second acceleration sensor 11 can be connected by way of a separate test line 36 with an analog/digital input of the microprocessor. In this manner a possible change of sensitivity of the acceleration sensors can be detected by comparing the response signals of the acceleration sensors with respect to the test pulses and checking the results against permissible deviation values.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Apparatus for activating a safety device in a motor vehicle upon impact of said motor vehicle; comprising:
   a first triggering path having a first acceleration sensor and digital processing means for analyzing a signal from said first acceleration sensor to produce a first output signal when said signal from said first acceleration sensor exceeds a first predetermined threshold value;
   a second triggering path having a second acceleration sensor and analog processing means for analyzing a signal from said second acceleration sensor to produce a second output signal when said signal from said second acceleration sensor exceeds a second predetermined threshold value;
   switch means coupled to receive said first and second output signals, for activating said safety device in response concurrent existence of said first and second output signals;
   said first triggering path being calibrated to respond to an impact later than said second triggering path, and thereby controlling timing of activation of said safety device; and
   said apparatus further comprising a pulse generator coupled to provide sequential test pulses to said first and second triggering paths in response to control signals generated by said digital processing means, and means for preventing said pulse generator from providing a test pulse to said first triggering path during existence of an output signal from said second triggering path.

2. Apparatus for motor vehicle safety device in the form of restraint systems, comprising:
- at least first and second triggering paths which are independent of one another, each having an acceleration sensor and an analysis circuit for producing an output signal when a signal from said acceleration sensor exceeds a predetermined threshold;
- at least one of said analysis circuits being a digital circuit, and at least another being an analog circuit;
- a pulse generator coupled to provide test pulses sequentially to the respective triggering paths, which pulses are analyzed separately in the respective triggering paths; and
- means for preventing said pulse generator from providing a test pulse to said first triggering path during existence of an output signal from said analysis circuit of said second triggering path.

3. Apparatus according to claim 2, wherein said microprocessor has an analog to digital input which is connected to an output of said acceleration sensor of said analog circuit.

4. Apparatus for motor vehicle safety device in the form of restraint systems, comprising:
- at least first and second triggering paths which are independent of one another, each having an acceleration sensor and an analysis circuit for producing an output signal when a signal from said acceleration sensor exceeds a predetermined threshold;
- at least one of said analysis circuits being a digital circuit comprising a microprocessor, and at least another being an analog circuit;
- pulse generator responsive to said microprocessor and coupled to provide test pulses sequentially to the respective triggering paths, which pulses are analyzed separately in the respective triggering paths; and
- means for preventing said pulse generator from providing a test pulse to said first triggering path during existence of an output signal from said analysis circuit of said second triggering path.

5. Apparatus according to claim 4, further comprising reset means for enabling said pulse generator to provide said test pulses, which reset means is operated independently of said microprocessor.

6. Apparatus according to claim 4, wherein the microprocessor is coupled to test points at least within said triggering paths.

* * * * *